United States Patent [19]

Meverden et al.

[11] Patent Number: 5,661,095
[45] Date of Patent: Aug. 26, 1997

[54] OLEFIN POLYMERIZATION CATALYST COMPONENT SUPPORTED ON A COPOLYMER OF AN OLEFIN AND AN UNSATURATED SILANE

[75] Inventors: Craig C. Meverden, Mason; Emory A. Ford, Loveland, both of Ohio

[73] Assignee: Quantum Chemical Corporation, Cincinnati, Ohio

[21] Appl. No.: 465,806

[22] Filed: Jun. 6, 1995

[51] Int. Cl.$^6$ .............. B01J 31/00; B01J 37/00; C08F 4/02; C08F 4/60
[52] U.S. Cl. ............ 502/102; 502/108; 502/109; 502/116; 502/118; 502/120; 502/158
[58] Field of Search ................. 502/108, 109, 502/116, 118, 120, 158

[56] References Cited

U.S. PATENT DOCUMENTS

| | | | |
|---|---|---|---|
| 3,225,018 | 12/1965 | Zutty | 260/88.1 |
| 3,772,261 | 11/1973 | Faltings et al. | 260/94.9 DA |
| 3,987,233 | 10/1976 | Sato et al. | 502/109 |
| 4,098,979 | 7/1978 | Maemoto et al. | 526/100 |
| 4,268,418 | 5/1981 | Hoff | 252/429 B |
| 4,294,724 | 10/1981 | McDaniel | 502/158 |
| 4,329,255 | 5/1982 | Beach et al. | 252/429 B |
| 4,404,343 | 9/1983 | Hoff | 526/142 |
| 4,407,727 | 10/1983 | Harris et al. | 502/115 |
| 4,568,730 | 2/1986 | Graves | 502/118 |
| 4,707,520 | 11/1987 | Keogh | 525/245 |
| 4,814,314 | 3/1989 | Matsuura et al. | 502/108 |
| 4,900,706 | 2/1990 | Sasaki et al. | 502/116 |
| 4,904,630 | 2/1990 | Matsuura et al. | 502/108 |
| 4,921,825 | 5/1990 | Kioka et al. | 502/104 |
| 4,972,034 | 11/1990 | Matsuura et al. | 502/116 |
| 5,023,223 | 6/1991 | Ebara et al. | 502/116 |
| 5,028,671 | 7/1991 | Kioka et al. | 502/116 |
| 5,051,484 | 9/1991 | Sasaki et al. | 526/151 |
| 5,077,250 | 12/1991 | Miyoshi et al. | 502/116 |
| 5,112,786 | 5/1992 | Fujita | 502/116 |
| 5,118,648 | 6/1992 | Furtek et al. | 502/116 |
| 5,139,985 | 8/1992 | Barbe' et al. | 502/109 |
| 5,177,043 | 1/1993 | Koyama et al. | 502/116 |
| 5,209,977 | 5/1993 | Heimberg et al. | 526/279 |
| 5,244,855 | 9/1993 | Morini et al. | 502/126 |
| 5,275,993 | 1/1994 | Fujita et al. | 502/127 |
| 5,331,071 | 7/1994 | Kataoka et al. | 525/128 |
| 5,338,609 | 8/1994 | Ondrus et al. | 526/279 |
| 5,489,634 | 2/1996 | Hara et al. | 502/116 |
| 5,498,770 | 3/1996 | Hosaka et al. | 502/116 |

FOREIGN PATENT DOCUMENTS

| | | |
|---|---|---|
| 6-819 | 11/1994 | Japan. |
| WO94/20545 | 9/1994 | WIPO. |

OTHER PUBLICATIONS

Bochkin et al., Reactive Polymers, vol. 9, pp. 99–107. Sep. 1988.

F.S. Dyachkovskii et al., J. Polymer Sci. Polymer Symp., vol. 68, pp. 97–108. Feb. 1980.

N.N. Greenwood, A. Earnshaw, Chemistry of the Elements, Pergamon Press, pp. 388, 419, 420. 1986.

*Primary Examiner*—Glenn A. Caldarola
*Assistant Examiner*—J. Pasterczyk
*Attorney, Agent, or Firm*—Gerald A. Baracka; William A. Heidrich

[57] ABSTRACT

A catalyst component useful in the polymerization of olefins which includes a support formed of a copolymer of an olefin and a silane monomer having at least one unsaturated hydrocaryl substitutent. A process for making the catalyst component as well as a catalyst composition which includes the catalyst component is also set forth.

34 Claims, No Drawings

5,661,095

OLEFIN POLYMERIZATION CATALYST COMPONENT SUPPORTED ON A COPOLYMER OF AN OLEFIN AND AN UNSATURATED SILANE

BACKGROUND OF THE DISCLOSURE

1. Field of the Invention

The present invention is directed to an organic polymer supported olefin polymerization catalyst component. More particularly, the present invention concerns a catalyst system, useful in the polymerization of olefins, which includes a catalyst component supported on a copolymer of an olefin and an unsaturated silane.

2. Background of the Prior Art

The polymerization of olefins is one of the most commercially important processes in the chemical industry. This importance is manifested in the extensive patent and technical literature devoted to this important process.

One aspect of this process, upon which particular attention has been focused, is the development of new and improved catalyst components and catalyst systems to provide improved olefinic polymers. One of the ways of developing new and improved catalytic components is the design of new supports. The development of new supported olefin polymerization catalysts has long been known as a fruitful means of obtaining improved performance of catalyst components. This is so since catalytic agents disposed on a support provide improved catalytic performance compared to the same catalytic agents employed in their unsupported state. This improved performance is manifested in higher catalytic activity and the production of polymers having enhanced properties.

In the prior art olefinic polymerization catalysts, including Ziegler-Natta catalysts, were usually supported on inert inorganic oxides such as silica, alumina, magnesia and the like. Such oxides, which come in a variety of particle sizes and porosities, are often credited with the above-described improvements in catalytic behavior.

Despite their usefulness, inorganic oxide supports have serious deficiencies. Succinctly put, they suffer from their inherent physical properties and their incompatibility with the product of the process in which they are employed, an olefin polymer.

In regard to the inherent physical property limitations of inorganic oxide supports, inorganic oxides adsorb water on their surfaces. Water is a well known catalytic poison which adversely affects catalytic activity. Thus, inorganic oxides, employed as supports, must be calcined at high temperatures, treated with appropriate compounds or both to remove physically adsorbed water from their surfaces prior to their use as an olefin polymerization catalyst component support.

Another adverse physical characteristic of inorganic oxides is their limited maximum pore size. Catalytic activity is directly proportional to pore size. It is true that inorganic oxides having large pore sizes are known. However, these oxides are friable and their use as catalytic supports is discouraged because they, through attrition, form undesirable fines.

Inorganic oxides not only adsorb water on their surface but also other undesirable catalytic poisons including oxygen. Thus, great care must be exercised in handling inorganic oxide supported catalyst components.

Inorganic oxides are incompatible with the product of the catalyzed reaction, organic polymers. As such, the supported catalyst component, which is included in the polymeric product, represents an undesirable containment therein. This may be a minor problem or a significant problem depending upon the catalytic activity of the catalyst system.

To overcome the above deficiencies of inorganic oxide supports in olefin polymerization catalyst components many investigators have developed polymeric supports in their stead. To merely illustrate these catalyst supports, they include the supports of U.S. Pat. Nos. 3,772,261; 4,098,979; 4,174,664; 4,268,418; 4,329,255; 4,404,343; 4,407,727; 4,568,730; 4,900,706; 4,921,825; 5,051,484; 5,118,648; 5,244,855; and 5,275,993. Many foreign patents describing polymeric supports, can be mentioned but they are merely cumulative of the supports mentioned in the aforementioned U.S. patents.

There has been a similar manifestation of interest in polymeric supports for olefin polymerization catalyst components in the non-patent technical literature. The following references illustrate recent developments in this technology: Dyachkovskii. et al., *J. Poly. Sci., Poly. Sym.*, 68:97 (1980); Dyachkovskii et al. in "Transition Metals and Organometallics as Catalysts for Olefin Polymerization," Kaminsky and Sinn, Eds., Springer-Verlag, Berlin, 1988 at pp. 67–68; Bochkin et al., *Reactive Polymers*, 9:99 (1988); Pomogails et al., *Poly. Sci.*, 36:535 (1994); Sun et al., *Stud. in Surf. Sci.*, 89:81 (1994); Sun et al., *J. Poly. Sci.: Part A: Poly. Chem.*, 32:2127 (1994); and Sun et al., *J. Poly. Sci.: Part A: Poly. Chem.*, 32:2135 (1994).

These and many other references disclose various and sundry supports for polymeric catalyst components. These supports, which are formed of polyolefins, usually polyethylene or polypropylene, polystyrenes, polyvinyl alcohols, poly(styrene-divinylbenzene), poly(methylmethacrylate) and the like, share several advantages over inorganic oxide supports.

With the exception of the Dyachkovskii et al. article in Volume 68 of *J. Poly. Sci., Poly. Sym.* none of the aforementioned references mention silane functionalized olefin polymers as a support. Dyachkovskii et al. describes such a support wherein silane functionality is incorporated by reacting an olefin polymer having pendant hydroxyl groups with a silane compound having the generic formula $R_2SiCl_2$.

What is common to the above disclosures is the advantages provided by polymeric supports. For one thing, polymeric supports usually require no dehydration prior to their use. Moreover, they can be easily functionalized so that they can be specially tailored to the particular needs of the active catalytic materials and the particular polymerization reaction desired. That is, they can be prepared such that the catalyst component can have specifically desired porosity, morphology and size controls. Finally, they can be provided at lower cost than equivalent inorganic oxide supports. All of these advantages are obtained without any compromise in the inertness of the support, a major reason for using inorganic oxides in this application.

A major problem associated with the use of organic polymer supports in the prior art, however, has been the inability of providing a sufficient number of functional groups on the surface of the support to insure anchoring of the catalytic agents disposed thereon. That is, such well known inorganic oxide supports as silica provide Si—OH and Si—OR functional groups for supporting transition metal compounds as well as reacting with silicon-, aluminum- and magnesium-containing compounds. In the past, polyethylene supports usually suffered from an inadequate concentration of surface-functional groups necessary to anchor the catalytically active components disposed thereon. As a result, polymeric supports, including polyolefin supports, because the concentration of functional groups on its surface could not support a sufficient concentration of active catalytic agents, to insure the desired degree of catalytic activity necessary to provide adequate productivity, produced supported catalysts with unacceptable levels of catalytic productivity.

Another problem associated with organic polymeric supports for olefin polymerization catalyst components in the prior art has been the inability to polymerize olefins such that the particle product had large spherical shape. Such a shape, as those skilled in the art are aware, significantly enhances the polymerization process, especially when conducted in the gas phase. Large uniformly spherical shaped particles permit the utilization of higher fluidization velocities since large spherical shaped particles are not entrained by the gaseous stream and removed from the reactor.

Moreover, large spherically shaped particles are more easily processed since the problem of fines, i.e. very small sized particles, which cause plugging in the transport of the polymeric product, is eliminated.

Finally, large uniform spherically shaped particles may obviate the costly step of pelletizing the polymeric product.

Of particular interest to the present invention is U.S. Pat. No. 5,209,977 to Heimberg et al. That patent describes a substantially spherical crosslinkable and/or crosslinked ethylene copolymer ranging in size from about 10 microns up to about 500 microns. The '977 patent is further directed to a process for preparing that sized powder and to a process of crosslinking the thermoplastic powder to reduce its melt flow rate.

These polymeric powders are described in the '977 patent as useful as coatings. Such coatings may be applied by dip coating, in either a static or fluidized bed, or by powder coating. The powders of the '977 patent may be applied in dispersed form, by roller coating, spray coating, slush coating or dip coating substrates such as metal, paper, paperboard and the like. These powders are also widely employed in conventional powder lining and powder molding processes such as rotational molding. Other applications of the powders of the '977 patent include use as an additive in paper pulp manufacture, as mold release agents, as additives to waxes, paints, caulks and polishers, and as binders for non-woven fabrics. There is no suggestion in the '977 patent of using these particles as catalyst supports.

It is apparent from the above remarks that a new organic polymeric support, which provides the advantages associated with such supports but which overcomes the low catalytic productivity associated with many polymeric supports in the prior art, would be highly desired.

BRIEF SUMMARY OF THE INVENTION

A new polymeric support has been discovered which provides the advantages associated with polymeric supports, i.e. low cost, the absence of inorganic oxide impurities and ease of handling, without the attendant disadvantages associated with these polymeric supports in the prior art, i.e. lower productivity resulting from a deficiency in a sufficient number of functionalized groups to anchor an adequate concentration of active catalyst components.

Specifically, the organic polymeric particles used as the support in the present invention are characterized by unique physical properties which permit the formation thereon of functionalized groups in sufficient concentration so as to permit active catalyst components to be disposed thereon in adequate concentrations so as to provide good catalytic activity.

Moreover, the support of the catalyst component of the present invention results in the formation of large spherical particles not obtained by the polymeric and inorganic supports of the prior art.

In accordance with the present invention, a supported olefin polymerization catalyst component is provided. The catalyst component includes an organometallic agent, said agent selected from the group consisting of at least one organometallic compound, at least one organometallic complex and mixtures thereof; a transition metal agent, said agent selected from the group consisting of at least one transition metal, at least one transition metal compound and mixtures thereof; and a support which comprises an olefin copolymer formed from an olefin monomer and unsaturated silane.

DETAILED DESCRIPTION

The particulate functionalized support of the present invention is a copolymer of an olefin and an unsaturated silane. It is emphasized that the copolymer of this invention includes direct polymerization of the monomers and the graft polymerization of an olefin polymer and an unsaturated silane monomer. Preferably, the particulate support of the present invention is an olefin-containing copolymer wherein the particles are substantially spherically shaped and have an average particle size of no more than about 500 microns. More preferably, the average particle size of the particles is in the range of between about 10 microns and about 250 microns. Still more preferably, the average particle size of the polyolefin support of the present invention is in the range of between about 20 microns and about 225 microns. Even still more preferably, the average particle size of the olefin polymer is in the range of between about 25 microns and about 200 microns.

The olefin employed in the polymeric particles of the present invention is preferably an α-olefin containing 2 to about 8 carbon atoms. More preferably, the α-olefin employed in the copolymer support of the present invention contains 2 to about 4 carbon atoms. Still more preferably, the α-olefin utilized in the copolymer support of the present invention is ethylene or propylene. Most preferably, the olefin utilized in the copolymer support of the present invention is ethylene.

The comonomer utilized in the copolymer support is an unsaturated silane. Preferably, the unsaturated silane comonomer is an unsaturated alkoxysilane. Still more preferably, the alkoxysilane utilized in forming the copolymer support has the structural formula

$$R\text{—}Si(R^1)_n(OR^2)_{3-n} \qquad (I)$$

where R is an ethylenically unsaturated hydrocarbyl having 2 to 6 carbon atoms; $R^1$ is a hydrocarbyl having from 1 to 10 carbon atoms; $R^2$ is an alkyl group having 1 to 4 carbon atoms; and n is 0, 1 or 2.

More preferably, the compound having the structural formula I is characterized by R being vinyl; $R^2$ being $C_1$–$C_3$ alkyl; and n being 0. In this preferred embodiment, the unsaturated alkoxysilane is vinyltrimethyoxysilane, vinyltriethyoxysilane or vinyltripropoxysilane.

Even more preferably, $R^2$ is methyl or ethyl. That is, the compound having the structural formula I is vinyltrimethoxysilane or vinyltriethoxysilane.

The copolymer support of the catalytic component of the present invention is present in a concentration such that the unsaturated silane constitutes between about 0.25% and about 20% by weight, based on the total weight of the copolymer. More preferably, the unsaturated alkoxysilane constitutes between about 1% and about 15% by weight, based on the total weight of the olefin-alkoxysilane copolymer support. Still more preferably, the concentration of compound I is in the range of between about 2% and about 10% by weight, based on the total weight of the copolymer support. Yet still more preferably, the unsaturated silane having the formula I comprises between about 3% and about 5% by weight, based on the total weight of the olefin copolymer support.

It is particularly preferred that the copolymer support of the present invention include only two monomers, a first monomer within the scope of the above-defined olefin and a second monomer within the meaning of the previously defined unsaturated silane.

To form the substantially spherically shaped particles within the contemplation of the present invention, an olefin copolymer within the meaning of that described above is charged into a reactor filed with a polar liquid and a nonionic surfactant. The reactor is a typical dispersing apparatus capable of delivering sufficient shearing action at elevated temperature and pressure. Specific details regarding agitation, and all other aspects of the dispersion forming process are described in detail in U.S. Pat. No. 5,209,977, incorporated herein by reference.

As stated therein, the dispersion process occurs at a temperature ranging from about 90° C. to about 250° C. The pressure is conducted at between about 1 atmosphere and about 217 atmospheres with the proviso that the pressure is consistent with the maintenance of the polar dispersing agent in the liquid phase. More preferably, the pressure range is from about 5 to about 120 atmospheres. The duration of the dispersion process ranges from about 5 minutes to about 2 hours, more preferably, from about 10 minutes to about 30 minutes.

The polar liquid dispersant, for obvious reasons, must not be a solvent for the olefin copolymer dispersed therein. The polar liquid is preferably a hydroxyl-containing compound. Hence, water, an alcohol, a polyol and mixtures thereof are usually employed. The polar liquid is present in a concentration such that the weight ratio of the polar liquid to the olefin copolymer ranges from about 0.8:1 to about 9:1, more preferably, from about 1:1 to about 5:1.

The nonionic surfactant employed to obtain the desired dispersion may be a block copolymer of ethylene oxide and propylene oxide. More preferably, these alkylene oxides are water-soluble and have molecular weights of more than about 3,500. Even more preferably, the nonionic surfactant contains a major amount, measured as weight percent, of ethylene oxide. The preferred surfactant is obtained by polymerizing ethylene oxide onto preformed polyoxypropylene segments.

The concentration of nonionic surfactant preferably ranges from about 4% to about 50% by weight, based on the weight of the olefin copolymer. More preferably, the nonionic surfactant is present in a concentration of between about 7% and about 45% by weight, again based on the weight of the olefin copolymer.

Particularly useful nonionic surfactants are those manufactured and sold by BASF Corporation, Chemicals Division under the trademark Pluronic. Such surfactants are within the contemplation of the preferred class of nonionic surfactants discussed above. That is, Pluronic [trademark] surfactants include a polyoxypropylene base and a polyoxyethylene segment polymerized thereon.

A particularly preferred Pluronic [trademark] surfactant is designated as F-98. That surfactant includes a polyoxypropylene, present in a final concentration of 20%, having an average molecular weight of 2,700, which is polymerized with ethylene oxide to give a final product having an average molecular weight of about 13,500. The final product, as stated above, contains 20 wt. % propylene oxide and 80 wt. % ethylene oxide. Other useful Pluronic [trademark] surfactants include F-88 (average molecular weight of 11,250, 20% by weight propylene oxide and 80% by weight ethylene oxide); F-108 (average molecular weight of 16,250, 20% by weight propylene oxide and 80% by weight ethylene oxide); and P-85 (average molecular weight of 4,500, 50% by weight propylene oxide and 50% by weight ethylene oxide).

Another preferred class of nonionic surfactants, similar to the aforementioned Pluronic [trademark] ethylene oxide-propylene oxide surfactants, is the class of Tetronic [trademark] surfactants. Tetronic [trademark] surfactants are a class of polymers wherein propylene oxide block copolymer chains are disposed upon an ethylenediamine nucleus and thereupon polymerized with ethylene oxide. The desirable Tetronic [trademark] surfactants, within the scope of the present invention, have molecular weights above 10,000 and contain a major portion by weight of ethylene oxide. Two preferred products are Tetronic [trademark] 707 which includes 30 wt. % polyoxypropylene polymerized with 70 wt. % oxyethylene and having an overall molecular weight of 12,000. Tetronic [trademark] 908, another preferred nonionic surfactant, is 20 wt. % polyoxypropylene and 80 wt. % oxyethylene having an overall molecular weight of 27,000.

Olefin copolymer support particles obtained by the aforementioned dispersion process may or may not be crosslinked. In the embodiment wherein the above-described dispersion process results in a thermoplastic, i.e. non-crosslinked polymer, that polymer may be subsequently crosslinked. The crosslinking step involves a second processing step wherein the particles of the first dispersion step are recovered from the dispersion after cooling, washing and drying.

In this method, the particles formed after the dispersion process, discussed above, are again contacted with a dispersing agent which, in a preferred embodiment, is water. Generally, the weight ratio of water to olefin copolymer powder ranges from about 0.001:1 to about 20:1, more preferably from about 0.01:1 to about 5:1. One or more other liquids may be included with water. These liquids are organic liquids miscible with water but not miscible with the copolymer. Thus, alcohols, polyols, ketones, aldehydes, carboxylic acids, carboxylic acid esters and the like are utilized. Indeed, if a carboxylic acid is employed with water as the suspending medium, it can also serve as the crosslinking catalyst. Specific details of the crosslinking process are provided in U.S. Pat. Nos. 5,209,977, 5,336,731 and 5,338,509 which patents are incorporated herein by reference.

The particulate copolymer support of the present invention, whether thermoplastic or cross-linked, is employed as the support of an olefin polymerization catalyst component. The supported catalyst component of the present invention preferably comprises an organometallic constituent, said constituent selected from the group consisting of compounds, complexes and mixtures thereof; and a transition metal agent, said agent selected from the group consisting of a transition metal, a transition metal compound and mixtures thereof.

The organometallic agent, provided as part of the supported catalyst component of the present invention, includes an organometallic compound which is selected from the group consisting of $$R^3_a M^1(OR^4)_{1-a} \quad (II)$$

where $M^1$ is a metal of Group IA of the Periodic Table of the Elements; $R^3$ and $R^4$ are the same or different and are hydrocarbyl; and a is 0 or 1.

Preferably, $M^1$ and a have the meanings given above; and $R^3$ and $R^4$ are the same or different and are $C_1$–$C_{20}$ hydrocarbyl.

More preferably, $R^3$ and $R^4$ are the same or different and are $C_1$–$C_{20}$ alkyl, $C_2$–$C_{20}$ alkenyl, $C_6$–$C_{20}$ cycloalkyl, $C_6$–$C_{20}$ aryl, $C_7$–$C_{20}$ alkaryl or $C_7$–$C_{20}$ aralkyl.

Still more preferably, the compound having the structural formula II is defined by $M^1$ and a having the meanings given above; and where $R^3$ and $R^4$ are the same or different and are $C_1$–$C_{12}$ alkyl, $C_2$–$C_{12}$ alkenyl, $C_6$–$C_{14}$ cycloalkyl, $C_6$–$C_{14}$ aryl, $C_7$–$C_{16}$ alkaryl or $C_7$–$C_{16}$ aralkyl, $$R^3_b M^2(OR^4)_c X_{2-(b+c)} \quad (III)$$

where $M^2$ is a metal of Group IIA or IIB of the Periodic Table of the Elements; b and c are independently 0, 1 or 2 with the provisos that at least one of b or c is not 0 and that the sum of b and c is not more than 2; X is halogen; $R^3$ and $R^4$ have the meanings defined above with reference to the compound having the structural formula II with the proviso that when b is 2, each $R^2$ can be the same or different and when c is 2, each $R^2$ can be the same or different.

Preferably, $R^3$ and $R^4$, in structural formula III, have the meanings given for the preferable embodiment of the compound having the structural formula II; X is fluorine, chlorine, bromine or iodine; and $M^2$, b and c have the meanings given above.

More preferably, $R^3$ and $R^4$, in structural formula III, have the meanings given for the more preferred embodiment of the compound having the structural formula II; X is chlorine or bromine; and $M^2$, b and c have the meanings given above.

Still more preferably, $R^3$ and $R^4$, in structural formula III, have the meanings given for the still more preferred embodiment of the compound having the structural formula II; X is chlorine; and $M^2$, b and c have the meanings given above, $$R^3_d M^3(OR^4)_e Y_{3-(d+e)} \quad (IV)$$

where $M^3$ is a metal of Group IIIA of the Periodic Table of the Elements; d and e are independently 1, 2 or 3, subject to the provisos that at least one of d and e is other than 0 and that the sum of d and e is not more than 3; Y is hydrogen or halogen; and $R^3$ and $R^4$ have the meanings given for these radicals in the compound having the structural formula II subject to the provisos that when d is 2 or 3, each $R^3$ can be the same or different and when e is 2 or 3, each $R^4$ can be the same or different.

Preferably, $R^3$ and $R^4$ have the meanings given for the preferred embodiment of the compound having the structural formula II; Y is halogen; $M^3$, d and e have the meanings given above.

More preferably, $R^3$ and $R^4$ have the meanings given for the more preferred embodiment of the compound having the structural formula II; and $M^3$, d and e have the meanings given above and $$R^3_f M^3 Y_{3-f} \quad (V)$$

where $M^3$, Y and $R^3$ have the meanings given above for the compound having the structural formula IV; and f is 1, 2 or 3, subject to the proviso that when f is 1, Y is halogen. The preferred and more preferred meanings of $R^3$ and Y are identical to the preferred and more preferred meanings, respectively, of these radicals given in defining the compound whose structural formula is IV.

Among the preferred compounds within the contemplation of compounds having structural formulae II to V are methyl lithium, ethyl lithium, n-butyl lithium, hexyl lithium, cyclohexyl lithium, allyl lithium, phenyl lithium, benzyl lithium, diphenylmethyl lithium, lithium methoxide, allyl sodium, benzyl sodium, sodium methoxide, sodium ethoxide, sodium phenolate, methyl magnesium chloride, methyl magnesium bromide, methyl magnesium iodide, ethyl magnesium chloride, ethyl magnesium bromide, cyclohexyl magnesium chloride, allyl magnesium chloride, phenyl magnesium chloride, phenyl magnesium bromide, benzyl magnesium chloride, dimethyl magnesium, butylethyl magnesium, dibutyl magnesium, diethyl zinc, magnesium methoxide, di-2-ethyl-1-hexyloxymagnesium, pentyloxymagnesium chloride, 2-methyl-1-pentyloxymagnesium chloride, 2-ethyl-1-hexyloxy-magnesium chloride, aluminum-n-butoxide, aluminum ethoxide, aluminum ethylhexoate, diethylaluminum ethoxide, diisobutylaluminum ethoxide, diisobutyl-aluminum 2,6-di-tert-butyl-4-methyl phenoxide, trimethylaluminum, triethylaluminum, triisobutylaluminum, tridodecylaluminum, trieicosylaluminum, tricyclohexylaluminum, tripheylaluminum, triisopropenylaluminum, tribenzylaluminum, triethylaluminum hydride, triisobutylaluminum hydride, dimethylaluminum bromide, diethylaluminum chloride, diisobutylaluminum bromide, didodecylaluminum chloride, didodecylaluminum bromide and isopropylaluminum dibromide.

Finally, a compound, ethylaluminum sesquichloride, having the structural formula $(C_2H_5)_3Al_2Cl_3$, although outside the contemplation of the compounds having the structural formulae II to V, is within the contemplation of the organometallic agents within the scope of the present invention.

Of the preferred compounds within the contemplation of the organometallic agents of the present invention, it is particularly preferred that the metal of the organometallic compound be magnesium or a complex thereof. Even more preferably, the organometallic compound or complex, is a magnesium dialkyl, wherein the alkyls are the same or different and contains 1 to 8 carbon atoms.

In another preferred embodiment of the catalyst component of the present invention the catalyst component includes two organometallic compounds or complexes. The first is the aforementioned magnesium-containing agent. The second is preferably an aluminum-containing compound. Of the aluminum-containing compounds within the contemplation of the present invention an aluminum trialkyl compound, for example triethylaluminum, is particularly preferred. It is emphasized that the recitation of the term "second" organometallic compound should not necessarily be taken as representative of the order of addition of the organometallic compounds or complexes. These agents may contact the support together or in random order.

The above discussion of organometallic agents have focused upon compounds thereof. It is emphasized that complexes of the foregoing organometallic compounds are within the contemplation of the present invention. For example, a magnesium organometallic compound may be complexed with an organoaluminum compound, preferably an aluminum trialkyl, to form a magnesium-aluminum complex. Magnesium-aluminum complexes within the contemplation of the present invention include those disclosed in U.S. Pat. No. 4,004,071, which is incorporated herein by reference. Complexes of the type contemplated for use in the present invention can be prepared in accordance with the teaching of Ziegler et al., *Annalen der Chemie*, 605:93–97 (1957).

Transition metal agents within the contemplation of the catalyst component of the present invention include transition metals and transition metal compounds. The transition metals within the scope of the present invention are metals of Groups IVB, VB, VIB and VIIB of the Periodic Table of the Elements. Preferred transition metals used in their elemental state or in compound form include titanium, vanadium, molybdenum, zirconium and chromium. Particularly preferred transition metals and transition metal compounds are titanium and vanadium and compounds thereof.

Transition metal compounds preferred for use in the present invention include titanium halides, alkoxytitanium halides, vanadium halides, vanadium oxyhalides, alkoxyvanadium halides, molybdenum halides, zirconium halides and organochromium compounds. For example, such compounds as titanium trichloride, titanium tetrachloride, vanadium trichloride, vanadium tetrachloride, vanadium oxychloride, molybdenum pentachloride, zirconium tetrachloride and chromium acetylacetonate are particularly preferred. Mixtures of transition metals are also contemplated for use in order to provide so called "dual site" catalysts. For example, the contacting of a titanium- and a vanadium-containing compound onto a support within the scope of the present invention is within the contemplation of this invention.

Olefin polymerization catalysts components, often referred to as Ziegler-Natta catalysts, typically incorporate a halogen, usually chlorine. The halogen source is usually provided by the magnesium and/or transition metal compound. Halogenated transition metal compounds are particularly useful in this regard. Other halogen sources include aluminum halides, silicon halides and phosphorus halides.

The formation of the catalyst component may also involve contact with an electron donor. Among the electron donors within the contemplation of the present invention are alcohols, phenols, ketones, aldehydes, carboxylic acids, carboxylic acid esters, ethers and the like. Preferably, the electron donor is an alkyl ester of an aliphatic carboxylic acid, an aliphatic alcohol, an aliphatic ketone or an aliphatic ether.

The supported catalyst component of the present invention includes the metal of the organometallic agent in a concentration of between about 0.1% and about 25%. More preferably, this concentration ranges from about 0.25% to about 10%, said percentages being by weight, based on the total weight of the unsupported catalyst component. The molar ratio of the metal of the organometallic agent to the transition metal ranges from about 0.25:1 and about 4:1, more preferably from about 0.5:1 to about 2.25:1.

The supported catalyst component of the present invention can be synthesized in various ways. One preferred method of forming the supported catalyst component involves slurrying the aforementioned support in an inert organic solvent, i.e. a $C_5$–$C_8$ alkane. The resultant slurry is, in turn, contacted with the organometallic compound, usually dissolved in an aliphatic hydrocarbon, preferably the same hydrocarbon utilized as the slurrying agent. This contact occurs over a time period ranging from about 30 minutes up to about 20 hours or more. The reaction between the support and the organometallic compound, however, is usually complete within about 30 minutes. As stated earlier, more than one organometallic compound or complex may be involved in this contacting step. The compounds, complexes or both may be introduced simultaneously or in random order.

When this contacting step is complete the slurry is contacted with a transition metal or a transition metal compound, again preferably dissolved in an aliphatic hydrocarbon, again more preferably the same hydrocarbon utilized as the slurrying agent.

It is particularly preferred that there not be a washing step subsequent to the last organometallic agent contacting step. In a washing step the aliphatic hydrocarbon slurrying agent is removed, e.g., by filtration, and the solid product of the organometallic agent and the support is slurried in a fresh supply of the same hydrocarbon previously utilized. Rather, the slurried product of the final organometallic compound contacting step is next contacted with the transition metal agent. A change in color of the solids slurried in the aliphatic hydrocarbon is noted upon contact with the transition metal agent. This color change is typically from pale yellow to brown. The hydrocarbon slurrying agent, however, typically remains colorless. The transition metal compound contacting step is complete in approximately 30 minutes or less. However, extending the duration of the transition metal compound contacting step does not adversely affect the catalyst component product. The supported catalyst resulting from this contacting step may be washed, as discussed above, and dried after recovery.

A washing step after the last organometallic agent contacting step with or without drying before contact with the transition metal agent is not recommended in that the olefin polymeric product produced in the polymerization reaction is characterized by a significant concentration of fines with a resultant lower bulk density than in the case where no washing (and optionally, drying step) between the organometallic agent and the transition metal agent contacting steps. This is not to suggest that a washing step should not occur between organometallic compound contacting steps in embodiments wherein there are two or more of such steps. It is to suggest that no washing step preferably occur subsequent to the last of such organometallic agent contacting steps.

It is emphasized that there is no restriction against the inclusion of one or more washing and/or drying step subsequent to the transition metal contacting steps.

As stated earlier, the olefin polymerization catalyst system of the present invention includes, in addition to the above-discussed catalyst compound, a co-catalyst. The co-catalyst of the olefin polymerization system of the present invention is at least one compound which contains at least one metal atom of a metal of one of the elements of Group IA, IIA, IIB, IIIA or IVA of the Periodic Table of the Elements. These compounds can be in the form of a metal alkyl, a metal hydride, an alkylmetal hydride and an alkylmetal halide. Thus, such classes of compounds as alkyllithium compounds, dialkylzinc compounds, trialkylboron compounds, trialkylaluminum compounds, alkylaluminum halides, alkylaluminum hydrides and the like may be preferably utilized. Mixtures of two or more of such compounds can also be employed. Of the compounds within the scope of the cocatalyst of the subject invention, organometallic compounds which include a metal of Group IIIA are particularly preferred.

In the preferred embodiment wherein the cocatalyst is an organometallic compound of a metal of Groups IIIA, the organic radical attached to the metal of Group IIIA is usually an alkyl, an alkylhydride or an alkylhalide. Moreover, of the metals of Group IIIA, aluminum is most preferred. Thus, such compounds as trialkylaluminums, i.e. trimethylaluminum, triethylaluminum, triisobutylaluminum, tri-n-hexylaluminum, ethylaluminum dichloride, ethylaluminum dibromide, ethylaluminum dihydride, diethylaluminum chloride and di-n-propylaluminum chloride are preferred. Other preferred cocatalysts are organometallic compounds of another Group IIIA metal, boron, for example, triethylboron. Other preferred compounds useful as the cocatalyst of the catalyst system of the present invention include diethylzinc, di-n-propylzinc, and n-butyllithium. Of the compounds useful as a co-catalyst in the catalyst system of the present invention, triethylaluminum is particularly preferred.

The compound or compounds which constitute the cocatalyst of the catalyst system of the present invention is utilized in amounts effective to promote the polymerization activity of the supported catalyst component discussed above. The concentration of co-catalyst employed can vary widely but is such that the molar ratio of the metal of the organometallic compound which constitutes the cocatalyst to the transition metal, present in the supported catalyst component, is preferably in the range of between about 1:1 about 500:1. More preferably, this molar ratio is in the range of between about 5:1 and about 100:1. Even more preferably, especially when the metal of the co-catalyst is aluminum and the transition metal is titanium, the molar ratio is between about 5:1 and about 50:1.

The catalyst system of the present invention may include additional catalyst components, in addition to the supported catalyst component and the cocatalyst, which are denoted as activators, promoters, modifiers or the like. Suffice it to say, the catalyst system is limited only by the requirement that there be a supported catalyst component of the type discussed above as well as a cocatalyst of the kind mentioned hereinbefore.

Examples of third catalyst components include halocarbons, such as carbon tetrachloride, carbon tetrabromide, dichloromethane, dibromomethane, 1,1-trichloroethane and commercially available chlorofluorocarbons and hydrochlorofluorocarbons. Other third catalyst components include silicon-containing compounds such as halosilanes and alkoxysilanes. Thus, silicon tetrachloride, trichlorosilane, alkoxysilanes, such as trialkylalkoxysilanes, dialkoxysilanes, such as dialkyldialkoxysilanes, trialkoxysilanes, such as trialkoxyalkylsilanes, and tetraalkoxysilanes may be employed as the third catalyst component of the catalyst system of the present invention.

The catalyst system of the present invention can be used in virtually any olefin polymerization process. Thus, the catalyst system may be used in gas phase polymerizations wherein a stirred or fluidized bed is employed, a solution polymerization wherein the olefin is in solution or in a slurry polymerization process wherein the polymer is insoluble in the slurrying medium. Obviously, in the case of solution and slurry processes, the solvent and the dispersing agent, respectively, must be maintained in the liquid phase. This requires maintenance of the requisite pressure, consistent with thermodynamic principles. The catalyst system of the present invention is particularly suited to gas phase polymerization reactions.

The catalyst system of the present invention is useful in the homopolymerization and copolymerization of alpha olefins, preferably alpha olefins containing from 2 to about 8 carbon atoms. More preferably, the polymers produced by the supported catalyst component system of the present invention are homopolymers of ethylene, homopolymers of propylene, copolymers of ethylene and $C_3$–$C_8$ α-olefins and copolymers of propylene and $C_1$–$C_8$ α-olefins. The olefin polymers produced by the catalyst system of the present invention are useful in the formation of all types of fabricated products including films, fibers, molded articles and extruded articles.

The following examples are given to illustrate the scope of the present invention. Since these examples are given for illustrative purposes only, the invention should not be limited thereto.

EXAMPLE 1

Preparation of Crosslinked EVTEOS Support

Three hundred forty-seven parts by weight of a random copolymer of ethylene and vinyltriethoxysilane (EVTEOS) having a melt flow rate of 5, as determined by ASTM Standard Test Procedure D 1238, and containing 4.1% by weight vinyltriethyoxysilane was charged into a Parr [trademark] reactor equipped with a thermowell and thermocouple connected to a digital display. The reactor, equipped with an agitator having three-bladed impellers driven by a 2 HP DC variable speed motor, was further charged with 810 parts by weight of deionized water, 25 parts by weight of glacial acetic acid and 97.2 parts by weight of Pluronic [trademark] F-98 nonionic surfactant. The reactor was heated at a temperature of 215° C. and a pressure of 340 psi for a period of 45 minutes. The impellers were turned on and agitation was continued for 15 minutes at 3500 rpm.

The contents of the reactor were rapidly discharged through a Strahman [trademark] valve into a stainless steel tank containing 5 liters of cold water. The resulting ethylene-vinyltriethoxysilane copolymer powder was sieved through a 595 μ mesh screen followed by separation of the liquid phase using a Buchner [trademark] funnel equipped with a filter cloth. The product was washed twice with deionized water (200 ml.) and allowed to dry in air.

The product of this procedure was analyzed to determine its average particle size. This, in turn, was calculated by determining its particle size distribution. Particle size distribution was determined by laser light scattering. Specifically, a Malvern Particle Size Analyzer [trademark] Model 2600C with the appropriate lens configuration, equipped to automatically calculate the distribution curve and average particle size, was used. In this determination, water was charged into a bath and circulated through the sample measuring chamber. After obtaining a base line measurement, the agitator and sonic vibrator were turned on and powder was added to the water bath until an obscuration value of 0.3 was obtained. After 8 minutes of agitation, measurements were taken over a period of time. A distribution curve and average particle size were determined. The average particle size reported was based on the particle size distribution of 80% of the distribution curve. That is, the top and bottom 10% of the particle size range was eliminated.

A summary of the physical properties of the support particles produced in this example are summarized in Table 1.

TABLE 1

|  | Example |
|---|---|
| Polymer | EVTEOS |
| Average Particle Size, μ | 150 |
| Particle Size Distribution |  |
| d(90%), μ | 222 |
| d(10%), μ | 109 |
| [d(90%) − d(10%)]/[d(50%)] | 0.75 |
| Shape | Spherical |
| Silane Content, mmol/g. | 0.18 |

TABLE 1-continued

|  | Example |
|---|---|
| Surface Area[1], m²/g. | 0.03 |
| Pore Vol[1], cm³/g. | 0.001 |
| Melt Index | 1.66 |

[1]Determined by the BET Method.

EXAMPLE 2

Preparation of EVTEOS Supported Catalyst Component

The EVTEOS support prepared in Example 1 (5.0 g.) was suspended in dry, deoxygenated heptane (100 ml.) in a round bottom flask and stirred at a temperature of 50° C. to 60° C. under a dry nitrogen blanket for 2 hours. The particles were thereupon allowed to settle. The supernatant liquid was decanted and the particles resuspended in heptane (100 ml.) The above procedure with stirring under moderate heat for 2 hours was repeated. The particles were dried under a flow of dry nitrogen.

The free flowing particles were again suspended in dry, deoxygenated heptane (50 ml.) in a stirred round bottom flask. A solution (2 ml.) of dibutylmagnesium (DBM) (3.36 wt % as Mg) in heptane was added to provide 0.4 mmol Mg per gram of EVTEOS. The mixture was heated to a temperature of 65° C. to 80° C. under a blanket of nitrogen until all the heptane was evaporated. The product was cooled to room temperature.

The Mg containing EVTEOS was resuspended in heptane (25 ml.). A solution (5.7 ml.) of 0.35M TiCl$_4$ (0.4 mmol Ti per gram EVTEOS) was slowly added to the stirred suspension. The suspended particles immediately turned brown. The resultant brown-colored product was isolated by evaporating off the heptane at a temperature of 65° C. to 80° C. under a nitrogen flow.

The brown, free-flowing powder product was substantially spheroidal and characterized by a narrow particle size distribution. The particles contained 1.8% Ti and 0.90% Mg, said percentages being by weight, based on the total weight of the supported catalyst. This catalyst component is more fully summarized in Table 2.

EXAMPLE 3

Preparation of EVTEOS Supported Catalyst Component

The EVTEOS support (5.0 g) prepared in Example 1 was suspended in dry, deoxygenated heptane (100 ml.) and stirred in a round bottom flask. A solution (11.0 ml.) of triethylaluminum (TEAL) (2.5 wt %) was added to the suspension to yield a product having 0.4 mmol Al per gram of EVTEOS. The product was stirred for 1 hour at room temperature at which time stirring was stopped with the result that the particles settled to the bottom. The supernatant liquid was decanted and the particles were resuspended in heptane (100 ml.). This washing procedure was repeated two times.

The thus washed particles were resuspended in heptane (25 ml.). To this suspension was added a solution (6.1 ml.) of dibutylmagnesium (DBM) (3.36 wt % as Mg) in heptane. The suspension was thereupon heated at 65° C. under a blanket of dry nitrogen until all the heptane was evaporated. A solution (17.9 ml.) of 0.35M titanium tetrachloride in heptane was slowly added to the particles with stirring. The suspended particles immediately turned brown upon addition of the TiCl$_4$ solution. Stirring continued for 30 minutes. Upon termination of stirring the particles settled, the supernatant liquid decanted and the particles were resuspended in heptane (100 ml.). This washing procedure was repeated until the decantate was colorless with no smoking in air indicating the absence of TiCl$_4$ in the heptane solvent.

The product was recovered by evaporating the colorless heptane at a temperature of 65° C. to 80° C. under a nitrogen blanket. This product contained 3.8% Ti (0.79 mmol/g); 1.9% Mg (0.78 mmol/g) and 0.4% Al (0.15 mmol/g), wherein said percentages are by weight, based on the total weight of the supported catalyst and said millimole concentrations are based on 1 gram of EVTEOS support.

This product, as well as a summary of the polymerization process, is tabulated in Table 2.

COMPARATIVE EXAMPLE 1

Preparation of an EVTEOS Supported Catalyst Component

The EVTEOS support (5.0 g.) prepared in Example 1 was slurried in dry, deoxygenated heptane (75 ml.) in a round bottom flask. A solution (10.0 ml.) of 0.633M butylethylmagnesium (BEM) in heptane (1.25 mmol Mg/g of EVTEOS) was added under a nitrogen gas blanket. The reaction was allowed to continue for 20 hours. Thereupon, the heptane was removed by filtration. The solid product was then resuspended in heptane (100 ml.). The thus formed slurry was reacted with a 1.0M solution (2.0 ml.) of TiCl$_4$ in heptane (0.4 mmol Ti/g of support) under vigorous stirring. The suspended particles immediately turned pale yellow without any change in the colorlessness of the supernatant liquid. After 30 minutes of vigorous stirring the heptane was removed by filtration. The solids were washed in heptane (75 ml.) and dried under vacuum. This washing procedure was repeated.

The catalyst component of this example is summarized in Table 2.

TABLE 2

| Catalyst Component of | Example 2 | Example 3 | Comparative Example 1 |
|---|---|---|---|
| Employing Support of Example | 1 | 1 | 1 |
| TEAL, mmol/g. | 0 | 0.4 | 0 |
| Unreacted Excess Removed | N/A | Yes | N/A |
| Mg Comp, mmol/g. | DBM, 0.4 | DBM, 1.25 | BEM, 1.25 |
| Unreacted Excess Removed | No | No | Yes |
| TiCl$_4$, mmol/g. | 0.4 | 1.25 | 0.4 |
| Unreacted Excess Removed | No | Yes | Yes |
| Catalyst Composition: |  |  |  |
| Al, mmol/g. | N/A | 0.15 | N/A |
| % Incorporated[1] | N/A | ~40% | N/A |
| Mg, mmol/g. | 0.37 | 0.78 | 0.01 |
| % Incorporated | ~100 | ~62 | ~0.01 |
| Ti, mmol/g. | 0.38 | 0.79 | 0.06 |
| % Incorporated | ~100 | ~62 | ~15 |
| Si, mmol/g. | 0.18 | 0.15 | 0.18 |

[1]Ratio of amount present in catalyst component to amount charged.

EXAMPLES 4 TO 11 AND COMPARATIVE EXAMPLE 2

Polymerization of Ethylene

Ethylene was polymerized in Examples 4 to 11 and Comparative Example 2 utilizing the catalyst components of Examples 1 and 2 and Comparative Example 1 as set forth in Table 3. Each of the polymerizations was carried out in a 1 liter Autoclave Engineers [trademark] reactor filled with dry and deoxygenated isobutane (500 ml.). Hydrogen, in an amount set forth in Table 3, was next charged into the reactor. Triethylaluminum cocatalyst and the catalyst component, in amounts summarized in Table 3, were next introduced into the reactor. Ethylene was then introduced into the reactor to bring the pressure therein to either 500 or 550 psi as noted in Table 3. Polymerization, at a temperature of 80° C. or 90° C., as summarized in Table 3, was conducted for 1 or 2 hours, also as tabulated in Table 3.

Each polymerization was terminated by depressurizing the reactor to remove the ethylene, hydrogen and isobutane and cooling the reactor to room temperature.

The results of each polymerization, in terms of catalytic activity, is tabulated in Table 3. Physical properties of most of the polyethylene product of these examples, i.e. melt index and mean particle diameter, is also summarized in Table 3.

TABLE 3

| | POLYMERIZATION DETAILS | | | | | | |
|---|---|---|---|---|---|---|---|
| Ex. No. | Cat. Comp. of Ex. No. | Amt, mg | TEAL, mmol | H₂, mmol | Temp, °C. | Pres., psi | Duration, hr. |
| 4 | 1 | 71 | 0.78 | 180 | 90 | 550 | 1 |
| 5 | 1 | 51 | 0.56 | 180 | 90 | 550 | 1 |
| 6 | 1 | 53 | 0.56 | 180 | 90 | 550 | 1 |
| 7 | 1 | 70 | 0.76 | 180 | 90 | 550 | 2 |
| 8 | 2 | 41 | 0.45 | 180 | 90 | 550 | 1 |
| 9 | 1 | 55 | 0.58 | 90 | 90 | 550 | 1 |
| 10 | 1 | 49 | 0.58 | 90 | 90 | 550 | 1 |
| 11 | 1 | 57 | 0.65 | 90 | 90 | 550 | 1 |
| CE2 | CE1 | 25 | 0.33 | 164 | 80 | 500 | 1 |

| CATALYTIC ACTIVITY | | POLYMER CHARACTERISTICS | | |
|---|---|---|---|---|
| Example No. | gPE/gCat-hr | Example No. | MI | MPD/μ |
| 4 | 430 | 4 | 0.83 | 1200 |
| 5 | 460 | 5 | 1.34 | 1700 |
| 6 | 390 | 6 | 1.61 | ND |
| 7 | 425 | 7 | 0.78 | 1600 |
| 8 | 1455 | 8 | 0.45 | ND |
| 9 | 850 | 9 | 0.11 | 2200 |
| 10 | 1055 | 10 | 0.11 | >3000 |
| 11 | 1023 | 11 | 0.14 | ND |
| CE2 | 70 | CE1 | ND | ND |

MPD = mean particle diameter
ND = not determined

The above embodiments and examples are given to illustrate the scope and spirit of the present invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A catalyst component comprising
an organometallic agent selected from the group consisting of at least one organometallic compound, at least one organometallic complex and mixtures thereof;
a transition metal agent selected from the group consisting of at least one transition metal, at least one transition metal compound and mixtures thereof; and
a support which comprises an olefin copolymer formed from an α-olefin monomer containing 2 to about 8 carbon atoms and a silane monomer having at least one unsaturated hydrocarbyl substituent.

2. A component in accordance with claim 1 wherein said support comprises particles having an average particle size of no more than about 500 microns.

3. A component in accordance with claim 2 wherein said particles are substantially spherical.

4. A component in accordance with claim 3 wherein said average particle size is in the range of between about 10 microns and about 250 microns.

5. A component in accordance with claim 4 wherein said average particle size is in the range of between about 20 microns and about 225 microns.

6. A component in accordance with claim 5 wherein said average particle size is in the range of between about 25 microns and about 200 microns.

7. A component in accordance with claim 1 wherein said silane monomer unsaturated silane is a compound containing an ethylenically unsaturated radical bonded to a silicon atom.

8. A component in accordance with claim 7 wherein said α-olefin contains 2 to about 4 carbon atoms.

9. A component in accordance with claim 8 wherein said α-olefin is selected from the group consisting of ethylene and propylene and said silane monomer has the structural formula

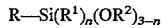

where R is an ethylenically unsaturated hydrocarbyl having 2 to 6 carbon atoms; $R^1$ is a hydrocarbyl having 1 to 10 carbon atoms; $R^2$ is an alkyl group having 1 to 4 carbon atoms; and n is 0, 1 or 2.

10. A component in accordance with claim 9 wherein said α-olefin is ethylene and wherein R is vinyl; $R^2$ is $C_1$ to $C_3$ alkyl; and n is 0.

11. A component in accordance with claim 10 wherein $R^2$ is methyl or ethyl.

12. A component in accordance with claim 7 wherein said silane monomer comprises between about 0.25% and about 20% by weight, based on the total weight of the olefin copolymer.

13. A component in accordance with claim 8 wherein said silane monomer comprises between about 1% and about 15% by weight, based on the total weight of the olefin copolymer.

14. A component in accordance with claim 9 wherein said silane monomer comprises between about 2% and about 10% by weight, based on the total weight of the olefin copolymer.

15. A component in accordance with claim 10 wherein said silane monomer comprises between about 3% and about 5% by weight, based on the total weight of the olefin copolymer.

16. A catalyst component comprising:
a magnesium-containing agent;
a transition metal compound selected from the group consisting of a titanium compound and a vanadium compound; and
a support which comprises an olefin copolymer formed from an alpha-olefin monomer containing 2 to about 8 carbon atoms and a silane monomer having at least one unsaturated hydrocarbyl substitutent.

17. A component in accordance with claim 16 wherein said magnesium-containing agent is selected from the group consisting of a magnesium dialkyl compound and a magnesium dialkyl complex, complexed with an aluminum trialkyl, where the alkyls are the same or different and contain 1 to 8 carbon atoms.

18. A component in accordance with claim 17 wherein said magnesium-containing agent is a magnesium dialkyl compound.

19. A component in accordance with claim 17 wherein said transition metal compound is selected from the group consisting of titanium halides, alkoxy-titanium halides, vanadium halides, vanadium oxyhalides and alkoxyvanadium halides.

20. A component in accordance with claim 19 wherein said silane monomer of said olefin copolymer support is selected from the group consisting of vinyltrimethoxysilane, vinyltriethoxysilane and vinyltripropoxysilane.

21. A component in accordance with claim 20 further comprising an aluminum trialkyl compound.

22. A catalyst composition system further comprising the catalyst component of claim 1 and at least one compound which contains at least one metal atom selected from the group consisting of metals of Group IA, IIA, IIB, IIIA or IVA of the Periodic Table of the Elements.

23. A catalyst composition comprising the catalyst component of claim 8 and an organometallic compound which includes a metal of Group IIIA.

24. A catalyst composition comprising the catalyst component of claim 16 and an organoaluminum compound.

25. A catalyst composition comprising the catalyst component of claim 21 as a first component and a trialkylaluminum as a second component.

26. A process of making a catalyst component comprising the steps of:

(a) contacting a copolymer of an α-olefin containing 2 to about 8 carbon atoms and a silane monomer having at least one unsaturated hydrocarbyl substitutent with at least one organometallic agent selected from the group consisting of an organometallic compound and an organometallic complex; and (b) contacting the product of step (a) with a transition metal agent selected from the group consisting of transition metals and transition metal compounds.

27. A process in accordance with claim 26 wherein there is no washing step between the last organometallic agent contacting step of step (a) and step (b).

28. A process in accordance with claim 27 wherein said steps (a) and (b) take place in an inert organic solvent.

29. A process in accordance with claim 28 wherein said silane monomer of said copolymer is selected from the group consisting of vinyltrimethoxysilane and vinyltriethoxysilane and said organometallic agent is a magnesium dialkyl.

30. A process in accordance with claim 29 wherein said inert organic solvent is a $C_5$–$C_8$ alkane.

31. A process in accordance with claim 30 wherein said transition metal agent is a titanium or vanadium compound.

32. A process in accordance with claim 31 including the step of contacting said copolymer with an aluminum trialkyl compound prior to contact with said magnesium dialkyl compound.

33. A process in accordance with claim 32 wherein the product of the contacting step with said magnesium dialkyl is, without washing, contacted with a titanium compound.

34. A process in accordance with claim 33 wherein said copolymer is an ethylene-vinyltriethoxy-silane copolymer, said aluminum trialkyl is triethylaluminum, said magnesium dialkyl is dibutylmagnesium, said titanium compound is titanium tetrachloride and said $C_5$–$C_8$ alkane is heptane.

* * * * *